United States Patent [19]

Kuehl et al.

[11] 4,304,757

[45] Dec. 8, 1981

[54] METHOD OF CONTROLLING THE MOLYBDENUM CONTENT OF URANIUM YELLOWCAKE

[75] Inventors: Guenter H. Kuehl; Howard S. Sherry, both of Cherry Hill, N.J.

[73] Assignee: Mobil Oil Corporation, New York, N.Y.

[21] Appl. No.: 821,895

[22] Filed: Aug. 4, 1977

[51] Int. Cl.$^3$ .................... C01G 1/00; C01G 43/00
[52] U.S. Cl. .................................. 423/15; 423/17; 423/19
[58] Field of Search .................... 423/15, 17, 7, 19

[56] References Cited

U.S. PATENT DOCUMENTS

| 2,811,412 | 10/1957 | Poirier | 423/15 X |
| 3,288,570 | 8/1963 | Henrickson | 423/17 X |
| 3,306,714 | 2/1967 | Goren | 423/15 X |
| 3,790,658 | 2/1974 | Fox | 423/15 |

FOREIGN PATENT DOCUMENTS 265695 2/1964 Australia ............................. 423/11

OTHER PUBLICATIONS

Merritt, R. C., *Extractive Metallurgy of Uranium*, US-AEC, Library of Congress Catalog #71-157076, pp. 231-235, 1971.

*Primary Examiner*—Richard E. Schafer
*Attorney, Agent, or Firm*—Charles A. Huggett; James F. Powers, Jr.

[57] ABSTRACT

A method of controlling the molybdenum content of uranium yellowcake which is precipitated from an eluate of ammonium carbonate. The pH of the eluate is maintained at a relatively high value, i.e., never less than 9.3, while the eluate is heated to strip off ammonia, carbon dioxide, and water. Ammonia is added to the eluate during heating to keep the pH high and the molybdenum in solution in the eluate. Also, the precipitated uranium yellowcake may be treated by adding aqueous ammonia and heating to form an insoluble uranium salt and a soluble molybdenum salt which can be filtered to produce a uranium yellowcake having a reduced molybdenum content.

7 Claims, No Drawings

METHOD OF CONTROLLING THE MOLYBDENUM CONTENT OF URANIUM YELLOWCAKE

BACKGROUND OF THE INVENTION

The present invention relates to a method of controlling the molybdenum content of a uranium product, i.e., yellowcake, and more particularly relates to controlling the molybdenum content of yellowcake (1) by controlling the pH of the eluate as the yellowcake precipitates from an eluate of ammonium carbonate and (2) by treating the precipitated yellowcake to remove substantial amounts of molybdenum that may coprecipitate with the uranium values.

In a uranium leach operation such as fully disclosed in U.S. application Ser. No. 732,234, filed Oct. 14, 1976, now abandoned, the uranium-bearing ore is contacted with an oxidant and a leach solution to dissolve the uranium values. The uranium values are then concentrated by passing the leach solution through an ion-exchange column or the like which adsorbs the uranium values from the leach solution. Next, an eluant, e.g., ammonium carbonate, is passed through the ionexchange column to desorb the uranium values in a greater concentration than existed in the leach solution. The pregnant eluate is then heated by steam stripping or the like to precipitate the uranium values, i.e., yellowcake, from the eluate.

In many areas where a leach operation, such as described above, is applicable, molybdenum values are also present in the ore. The molybdenum will react similarly to the uranium in that the molybdenum values will oxidize and will leach into the solution along with the uranium. Likewise, the molybdenum values will be adsorbed onto the ion-exchange column and are eluted from the resin along with the uranium values by the eluant. When the pregnant eluate is subjected to steam stripping, a portion of the molybdenum values, e.g., molybdic acid, will coprecipitate with the uranium values and is considered as an undesirable contaminant in the yellowcake. If the molybdenum content in the yellowcake exceeds a specified value, e.g., 0.6% by weight, the yellowcake may require further expensive processing before it will be accepted by a commercial refiner. Since molybdenum is not easily removed completely before the precipitation step, the need for reducing the amount of molybdenum coprecipitated with the yellowcake is readily apparent.

SUMMARY OF THE INVENTION

The present invention provides a method of controlling the molybdenum content of uranium yellowcake during precipitation from an eluate of aqueous ammonium carbonate and of treating the precipitated uranium yellowcake to remove at least a portion of the molybdenum values that may coprecipitate.

In accordance with the present invention, an eluate of aqueous ammonium carbonate having both uranium and molybdenum value dissolved therein is heated to vaporize and drive off ammonia, carbon dioxide, and water. As carbon dioxide evolves from the eluate, the uranium values begin to precipitate. A substantial portion of the carbon dioxide will evolve before any significant amounts of ammonia are removed. This permits substantial amounts of the uranium yellowcake to precipitate with a minimum of molybdenum contamination. However, when ammonia begins to evolve, the pH of the eluate will also begin to drop and since the ammonia keeps the molybdenum values in solution in the eluate, the molybdenum begins to precipitate with the uranium yellowcake.

To control this unwanted coprecipitation of molybdenum in the present invention, the pH of the eluate is monitored during the heating and is maintained above at least 9.3 at all times during precipitation of uranium yellowcake. The pH is maintained at a relatively high pH by adding ammonia to the eluate during the heating thereof. When the pH drops to a predetermined value, never less than 9.3, the precipitation of uranium yellowcake is ceased.

Even with pH control of the eluate, some molybdenum will normally coprecipitate with the uranium yellowcake. If this molybdenum content exceeds specifications, the uranium yellowcake is further treated in accordance with the present invention by adding aqueous ammonium hydroxide to the yellowcake and heating the mixture. This forms insoluble ammonium polyuranates and soluble ammonium molybdate which can be filtered to remove at least a portion of the molybdenum values from the uranium yellowcake. The actual operation and the apparent advantages of the invention will be better understood by referring to the following detailed description.

DESCRIPTION OF THE PREFERRED EMBODIMENT

In leaching uranium from its ore, be it at the surface after mining or in situ, the ore is normally contacted with an oxidant, e.g., $O_2$, hydrogen peroxide, air, sodium chlorate or other oxidants, to oxidize the uranium to its hexavalent state. A leach solution, e.g., alkaline carbonates and/or bicarbonates, is flowed through the ore and the uranium values are dissolved therein. As is known, molybdenum when present in the ore will also oxidize and will dissolve along with the uranium values into the leach solution. The leach solution is passed through an ion-exchange medium or the like which adsorbs the uranium and molybdenum values from the solution. When the ion-exchange medium becomes effectively loaded, an eluant, i.e., ammonium carbonate, is passed through the ion-exchange medium to desorb the uranium and molybdenum values in a greater concentration than that which existed in the leach solution.

The pregnant eluate is passed to a precipitator which may be one or more stirred and/or baffled vessels. Steam is passed through the precipitator to heat the eluate which causes ammonia, carbon dioxide, and water to vaporize and be stripped from the eluate.

The uranium values precipitate as a slurry of yellowcake. The uranium oxide values (yellowcake) are permitted to settle from the liquor of the slurry and the settled yellowcake is then centrifuged or vacuum filtered before drying to form the final yellowcake product of the operation. For complete details of such an operation, see U.S. application Ser. No. 732,234, filed Oct. 14, 1976, now abandoned.

In steam stripping the eluate as described above, the molybdenum values, e.g., molybdic acid, in the eluate, unless controlled, will coprecipitate with the uranium values and form an undesired contaminant in the yellowcake. Since most commercial refiners of yellowcake restrict the amount of molybdenum contamination that they will tolerate, it is necessary to control the molybdenum precipitation within designated specifications in order to produce a saleable yellowcake product.

In accordance with the present invention, the pH of the eluate is controlled during the steam stripping step to keep the molybdenum values in solution in the eluate thereby preventing coprecipitation of substantial amounts of molybdenum with the yellowcake. Further, the present invention provides treatment of the precipitated yellowcake to remove additional amounts of molybdenum values, if necessary, to bring the yellowcake within desired commercial specifications.

In the steam stripping of yellowcake from an eluate containing $(NH_4)_4[UO_2(CO_3)_3]$ and excess ammonium carbonate, carbon dioxide ($CO_2$), ammonia ($NH_3$), and water ($H_2O$) are vaporized causing the pH of the eluate to increase initially and then to drop. In the present invention, it has been found that the amount of molybdenum values (e.g., $MoO_3$) which precipitates in the yellowcake increases as the pH decreases. This results from the uranium being held in the eluate by the carbonate ions while the molybdenum is held in the eluate by the ammonium ions. Therefore, as both $NH_3$ and $CO_2$ are vaporized from the eluate, both uranium and molybdenum precipitate. However, the $CO_2$ evolves from the eluate more readily than does the $NH_3$ so as much as 90% of the $CO_2$ can be removed from the eluate before significant amounts of $NH_3$ are lost. This allows substantial amounts of uranium to be precipitated before coprecipitation of molybdenum becomes an acute problem.

However, as ammonia does evaporate from the eluate, molybdenum precipitation increases substantially. Accordingly, in the present invention, the pH of the eluate is monitored and is kept at a high value by adding ammonia to the eluate during the steam stripping step. This allows a substantial portion of the uranium values to precipitate from the eluate without substantial molybdenum precipitation.

In an experiment involving the precipitation of uranium yellowcake by thermal decomposition of $[UO_2(CO_3)]^{4-}$ anions and excess ammonium carbonate in solution, a volume decrease caused by evaporation of water was observed. Two examples were run wherein this volume was replaced during the experiment by deionized water in Example A and by dilute aqueous ammonia in Example B. The results are as follow:

TABLE 1

|  | Example A | Example B |
|---|---|---|
| Final pH | 9.01 | 8.84 |
| $MoO_3$, wt % in product | 1.02 | 0.45 |
| $CO_3^=$, wt % in product | 5.00 | 3.92 |

Although the pH of the reaction mixtures was not controlled in this experiment and the final pH was lower than intended, Example B shows a definite decrease in both $MoO_3$ and $CO_3^{--}$ contents, compared with Example A.

Examples A and B demonstrate the effect of ammonia addition during stripping of the eluate. It is evident that continuous addition of ammonia during stripping decreased the amount of molybdenum incorporated in the yellowcake, even though the pH finally dropped more than intended. This final drop can only increase the percentage of Mo in the precipitate, in Example B more so than in Example A because the final pH is lower. In spite of this disadvantage, Example B shows considerably reduced Mo and $CO_3^{--}$ contents.

Additional experiments were run where precipitation was carried out without pH control (TABLE 2) and with pH control (TABLE 3) which show the molybdenum content (expressed in weight % Mo=2/3 of weight % $MoO_3$) in yellowcake precipitated from the same eluate at different pH levels and temperatures.

TABLE 2

| | Without pH Control | |
|---|---|---|
| pH | U in Solution wt. % | Mo in Dried Cake wt. % |
| 9.73 | 0.45 | — |
| 9.48 | 0.24 | 0.61 |
| 9.33 | 0.02 | 0.59 |
| 9.01 | 0.01 | 0.68 |

TABLE 3

| With pH Control | | | | | |
|---|---|---|---|---|---|
| 175° F., pH 9.6 | | 190° F., pH 9.6 | | 190° F., pH 10.5 | |
| U in Solution wt. % | Mo in Dried Cake wt. % | U in Solution wt. % | Mo in Dried Cake wt. % | U in Solution wt. % | Mo in Dried Cake wt. % |
| 0.53 | — | 0.47 | — | 0.45 | — |
| 0.41 | 0.41 | | | | |
| 0.31 | 0.35 | 0.33 | 0.36 | 0.32 | 0.19 |
| 0.18 | 0.30 | 0.18 | 0.29 | 0.20 | 0.16 |
| 0.08 | 0.28 | 0.10 | 0.29 | 0.05 | 0.15 |
| 0.04 | 0.28 | 0.03 | 0.29 | 0.02 | 0.16 |
| 0.01 | 0.30 | 0.01 | 0.30 | | |
| | | | | <0.001 | 0.16 |

The data indicate that yellowcake can be precipitated even at pH 10.5, and a considerable reduction of Mo content can be achieved in this way. Further analysis of experimental data indicates that a careful control of pH of the eluate by adding ammonia to keep it above at least 9.3 at all times will yield a considerably improved yellowcake product.

Even with pH control during the precipitation step, some molybdenum values, e.g., molybdic acid, may coprecipitate with the yellowcake. This molybdenum precipitate consists of white needles believed to be $\beta$—$MoO_3.H_2O$, i.e., a particular crystal structure of $MoO_3.H_2O$. If it is precipitated in the presence of yellowcake, it forms a physical mixture with the uranium oxide. It is readily soluble in ammonia solution whereas uranium trioxide forms insoluble ammonium polyuranates:

$$MoO_3 + 2\ NH_4OH = (NH_4)_2MoO_4 + H_2O \quad (1)$$

$$2\ UO_3 + 2\ NH_4OH = (NH_4)_2\ U_2O_7 + H_2O \quad (2)$$

Part of the molybdenum may precipitate simultaneously with uranium trioxide and may form $UO_2MoO_4$, uranyl molybdate. Molybdenum precipitated in this form probably requires recrystallization in the presence of ammonia to be removed from the yellowcake. To do this, the precipitated yellowcake is treated by adding ammonium hydroxide which results in:

$$2\ UO_2MoO_4 + 6NH_4OH = (NH_4)_2\ U_2O_7 + 2(NH_4)_2\ MoO_4 + 3H_2O \quad (3)$$

The following experiments were conducted which illustrate the effectiveness of the treatment of yellowcake with ammonium hydroxide.

EXAMPLE 1

Five grams of yellowcake, dried at ambient temperature, were heated with 50 ml of concentrated $NH_4OH$ (29.5% $NH_3$) to 100° C. in an autoclave for 16 hours. The solid was filtered, washed and dried at ambient temperature. The results show that 80% of the $MoO_3$ and $CO_3^{--}$ were removed by this procedure.

|  | $MoO_3$ | $CO_3=$ |
| --- | --- | --- |
| Before treatment, wt. % | 1.02 | 5.00 |
| After treatment, wt. % | 0.22 | 1.08 |

EXAMPLE 2

Ten grams of filter cake (about 50%–60% solids) were slurried with 150 g. of water and the pH adjusted to 11 with ammonium hydroxide. The mixture was heated to 140° F. for 16 hours. The solid was filtered, washed and dried at ambient temperature. The result shows again reduction of both $MoO_3$ and $CO_3^{--}$ contents:

|  | $MoO_3$ | $CO_3=$ |
| --- | --- | --- |
| Before treatment, wt. % | 0.23 | 6.4 |
| After treatment, wt. % | 0.13 | 3.76 |

In both the pH control of the precipitation step and the treatment of the yellowcake, the carbonate content of the final product is reduced. Since the carbonate content is also considered as an undesirable contaminant of yellowcake, both steps produce a further benefit in the processing of the yellowcake.

What is claimed is:

1. A method of controlling the molybdenum content of uranium yellowcake precipitated from an eluate of aqueous ammonium carbonate, said method comprising:
    heating said eluate to vaporize ammonia, carbon dioxide, and water from the eluate to precipitate uranium yellowcake from said eluate;
    maintaining the pH of said eluate above at least 9.3 during the precipitation of said uranium yellowcake; and
    ceasing precipitation of said uranium yellowcake when the pH of said eluate drops below a predetermined value of not less than 9.3.

2. The method of claim 1 wherein the step of heating said eluate comprises:
    contacting said eluate with steam.

3. The method of claim 1 wherein the step of maintaining the pH of said eluate comprises:
    adding ammonia to said eluate during said heating of said eluate.

4. The method of claim 2 wherein the step of maintaining the pH of said eluate comprises:
    adding ammonia to said eluate during said heating of said eluate.

5. The method of claim 1 including the step of removing at least a portion of the molybdenum values that may coprecipitate with said uranium yellowcake, said step comprising:
    adding aqueous ammonium hydroxide to said uranium yellowcake;
    heating the mixture of said uranium yellowcake and said ammonium hydroxide; and
    filtering said mixture to recover said uranium yellowcake having a reduced molybdenum content.

6. The method of claim 5 wherein the step of heating said eluate comprises:
    contacting said eluate with steam.

7. The method of claim 6 wherein the step of maintaining the pH of said eluate comprises:
    adding ammonia to said eluate during said heating of said eluate.

* * * * *

UNITED STATES PATENT AND TRADEMARK OFFICE
CERTIFICATE OF CORRECTION

PATENT NO. : 4,304,757
DATED : December 8, 1981
INVENTOR(S) : Gunter H. Kuehl and Howard S. Sherry It is certified that error appears in the above—identified patent and that said Letters Patent is hereby corrected as shown below:

Column 1, line 24, "ionex-" should read --ion-ex- --.

Column 3, line 40, "[$UO_2$(-" should read --[$UO_2$(--. Column 3, line 57, "$CO_3$--" should read --$CO_3^=$--. Column 3, line 68, "$CO_3$--" should read --$CO_3^=$--. Column 5, line 9, "$CO_3$--" should read --$CO_3^=$--. Column 5, line 25, "$CO_3$--" should read --$CO_3^=$--.

Signed and Sealed this

Fifteenth Day of June 1982

[SEAL]

Attest:

GERALD J. MOSSINGHOFF

Attesting Officer — Commissioner of Patents and Trademarks